United States Patent
Araki

Patent Number: 5,838,494
Date of Patent: Nov. 17, 1998

[54] APPARATUS FOR DISPLAYING IMAGE ALLOWING OBSERVER TO RECOGNIZE STEREOSCOPIC IMAGE

[75] Inventor: Keisuke Araki, Yokohama, Japan

[73] Assignee: Canon Kabushiki Kaisha, Tokyo, Japan

[21] Appl. No.: 585,501

[22] Filed: Jan. 16, 1996

[30] Foreign Application Priority Data

Jan. 19, 1995 [JP] Japan .................................. 7-006383

[51] Int. Cl.$^6$ ........................................................ G09G 3/36
[52] U.S. Cl. .......................... 359/455; 359/443; 359/456; 359/458; 355/22
[58] Field of Search .................................. 359/443, 455, 359/456, 458, 36, 40; 355/22

[56] References Cited

U.S. PATENT DOCUMENTS

| | | | |
|---|---|---|---|
| 4,959,641 | 9/1990 | Bass et al. | 340/700 |
| 5,019,855 | 5/1991 | Lam | 355/22 |
| 5,349,419 | 9/1994 | Taguchi et al. | |
| 5,371,627 | 12/1994 | Baccei et al. | 369/462 |

FOREIGN PATENT DOCUMENTS 5-289208  5/1993  Japan .

*Primary Examiner*—Daniel P. Malley
*Attorney, Agent, or Firm*—Morgan & Finnegan LLP

[57] ABSTRACT

This invention relates to a stereoscopic image display apparatus which allows an observer to recognize a stereoscopic image, and has a lenticular lens sheet constituted by arranging a plurality of lenticular lenses, and a display unit for sequentially arranging and displaying, on a rear surface portion of the lenticular lens sheet, bundles each including n stripe images which are obtained by dividing n parallax images from different view points into a plurality of stripe images, and bundling corresponding stripe images constituting the respective parallax images. When the deviation amount of the central position of each of the lenticular lenses and the central position of the bundle of stripe images is given by $\gamma(t-r)/(2D0)$ (where K is the assumed interval between two eyes of the observer, D0 is the optimal stereoscopic viewing distance, t is the thickness of the lenticular lens sheet, and r is the radius of curvature of the lenticular lens) at an end portion of an image displayed by the display unit, the apparatus satisfies $0<\gamma<1$.

8 Claims, 10 Drawing Sheets

201  202

211  212  213 a1 a2 a3 a4
LINEAR IMAGE

FIG. 11A $$\begin{pmatrix} \text{WHEN THE CONDITION OF} \\ 0 \leq \gamma \leq \\ n(1-(N-1)\cos\phi)/(n-(N-1)\cos\phi) \\ \text{IS SATISFIED} \end{pmatrix}$$

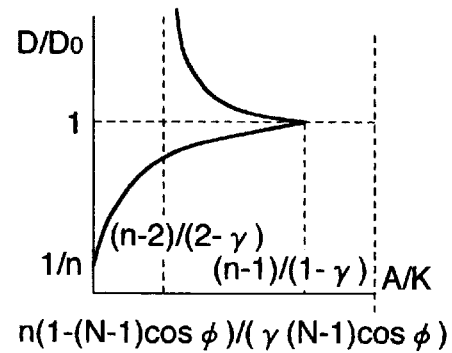

FIG. 11B $$\begin{pmatrix} \text{WHEN THE CONDITION OF} \\ n(1-(N-1)\cos\phi)/(n-(N-1)\cos\phi) < \gamma \\ < 2n(1-(N-1)\cos\phi)/(n-2(N-1)\cos\phi) \\ \text{IS SATISFIED} \end{pmatrix}$$

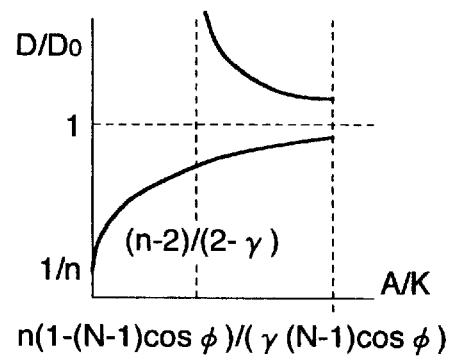

FIG. 11C $$\begin{pmatrix} \text{WHEN THE CONDITION OF} \\ 2n(1-(N-1)\cos\phi)/(n-2(N-1)\cos\phi) \\ < \gamma \text{ IS SATISFIED} \end{pmatrix}$$

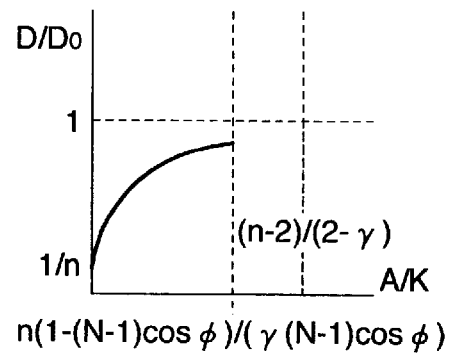

APPARATUS FOR DISPLAYING IMAGE ALLOWING OBSERVER TO RECOGNIZE STEREOSCOPIC IMAGE

BACKGROUND OF THE INVENTION

1. Field of the Invention

The present invention relates to a three-dimensional display apparatus for obtaining a stereoscopic image from a plurality of parallax images from different view points at predetermined intervals using a lenticular lens sheet.

2. Related Background Art

A three-dimensional display apparatus using a lenticular lens sheet has been extensively studied since around 1970, and the study results are described in, e.g., "O plus E" magazine (November 1993, pp. 100 to 104). The three-dimensional display apparatus using a lenticular lens sheet realizes stereoscopic viewing without using any equipment (spectacles) unlike in an apparatus which obtains stereoscopic viewing using spectacles that input images of different polarized light components to the right and left eyes. Stereoscopic viewing in the three-dimensional display apparatus using a lenticular lens sheet will be explained below.

FIG. 1 is a schematic view for explaining stereoscopic viewing in the three-dimensional display apparatus using a lenticular lens sheet.

Referring to FIG. 1, observation positions R and L correspond to the view points of the right and left eyes. A lenticular lens sheet 101 is constituted by arranging a plurality of surfaces (lenticular lenses) each having the same radius of curvature and a lens effect in one direction. The lenticular lens sheet has a rear surface portion 102 on which linear images are formed. On the rear surface portion 102, linear images, which are obtained by dividing two images having a parallax and formed based on the different, right and left view points, along the longitudinal direction of the respective lenticular lenses of the lenticular lens sheet 101, are formed. More specifically, linear images 102a and 102b that can satisfactorily give a parallax upon observation at the view points L and R in units of lenticular lenses are alternately formed.

In the optical system with the above-mentioned arrangement, an observer can obtain an image with a parallax by observing, via the lenticular lens sheet from the right and left view points R and L, the linear images 102b with his or her right eye and the linear images 102a with his or her left eye, thus realizing stereoscopic viewing.

As a method of forming linear images, which give a parallax in observation at the view points R and L, on the rear surface portion of the lenticular lens sheet in the above-mentioned optical system, methods using a "real size" image display system and a "projection" image display system are known. Each of these "real size" and "projection" image display systems is classified into reflection and transmission type systems. The "real size" and "projection" image display systems will be briefly described below.

The "real size" image display system will be described below.

FIGS. 2A and 2B are perspective views showing the lenticular lens sheet and a portion, which constitutes linear images and is formed on the rear surface portion of the sheet, in the "real size" image display system. FIG. 2A shows a reflection type system, and FIG. 2B shows a transmission type system.

In a reflection type "real size" image display system shown in FIG. 2A, printed matter 202 of images with a parallax, which are similar to the above-mentioned linear images shown in FIG. 1, and are formed based on different, right and left view points, is disposed on the rear surface portion of a lenticular lens sheet 201. In this system, light reflected by the printed matter 202 is observed from predetermined view point positions via the lenticular lens sheet 201, thus observing an image with a parallax. On the other hand, in a transmission type "real size" image display system shown in FIG. 2B, a color film 212, on which images with a parallax formed based on different, right and left view points are formed, is disposed on the rear surface portion of a lenticular lens sheet 211, and a backlight 213 for illuminating the color film 212 is arranged behind the lenticular lens sheet 211. In this system, illumination light (transmission light) of the color film 212 illuminated by the backlight 213 is observed from predetermined view point positions via the lenticular lens sheet 211, thus allowing observation of an image with a parallax.

The "projection" image display system will be described below.

FIGS. 3A to 3C are perspective views showing the lenticular lens sheet and a portion, which constitutes linear images and is formed on the rear surface portion of the sheet, in the "projection" image display system. FIG. 3A shows a reflection type system, and FIGS. 3B and 3C show a transmission type system.

A reflection type "projection" image display system shown in FIG. 3A is constituted by two projectors 303a and 303b, which respectively project images with a parallax formed based on different, right and left view points, and a lenticular lens sheet 301. In this reflection type "projection" image display system, images projected by the projectors 303a and 303b are incident on the lenticular lens sheet 301 at different angles, thereby forming images, which give a parallax to the right and left eyes and are similar to the above-mentioned linear images shown in FIG. 1, on a diffusion surface 302 on the rear surface portion of the lenticular lens sheet 301. When the formed images are observed from predetermined view point positions R and L via the lenticular lens sheet 301, an image with a parallax can be observed.

A transmission type "projection" image display system shown in FIG. 3B is constituted by two lenticular lens sheets 311 and 311' which use each other's diffusion portions on their rear surface portions as a single diffusion portion 312 and have the same shape, and two projectors 314a and 314b for respectively projecting images with a parallax formed based on different, right and left view points. In this transmission type "projection" image display system, when images projected by the projectors 314a and 314b are incident on one lenticular lens sheet 311' at different angles, images, which are similar to the above-mentioned linear images shown in FIG. 1 and give a parallax to the right and left eyes, are formed on the diffusion surface 312. When the formed images are observed from predetermined view point positions R and L via the other lenticular lens sheet 311, an image with a parallax can be observed.

A transmission type "projection" image display system shown in FIG. 3C is constituted by an LCD video projector 323 for projecting a synthesized image which is similar to the above-mentioned linear images shown in FIG. 1 and is formed based on different, right and left view points, and a lenticular lens sheet 321. In this transmission type "projection" image display system, a synthesized image, which is similar to the above-mentioned linear images shown in FIG. 1 and gives a parallax to the right and left eyes is formed on a diffusion surface 322 on the rear surface portion of the lenticular lens sheet 321. When the formed synthesized image is observed from predetermined view point positions R and L via the lenticular lens sheet 321, an image with a parallax can be observed.

In addition to the methods using the above-mentioned systems, a method for observing an image on a flat panel display such as a liquid crystal television via a lenticular lens sheet, and the like are known. Such techniques can be used for both still images and dynamic images.

In any of the above-mentioned methods for realizing stereoscopic viewing using a lenticular lens sheet, a region of view points, called a stereoscopic viewing region, which allows stereoscopic viewing, is present, and is narrow. For this reason, even upon a small view point movement, the right and left view point positions fall outside the stereoscopic viewing region, and the stereoscopic feeling may be reversed or stereoscopic viewing may be totally disturbed. In order to widen the stereoscopic viewing region, the following method is used.

When the number n of linear images formed on the rear surface portion of the lenticular lens sheet is increased (e.g., the number of different parallax images is increased from two to four), the stereoscopic viewing region can be widened. For example, as shown in FIG. 4, if the number of linear images to be formed on each lens on the rear surface portion of a lenticular lens sheet 401 is increased from two to four (linear images 402), even when the view point positions deviate from the stereoscopic viewing region in the case of two images, the pair of linear images to be observed by the right and left images shifts to another pair in correspondence with the deviation, but stereoscopic viewing can be maintained. More specifically, in an optical system in which the number of linear images is increased from two to four, even when the view point positions deviate from the stereoscopic viewing region in the case of the two images, an image a2 observed by, e.g., the right eye shifts to an image a3 and the image a3 observed by the left eye shifts to an image a4 in correspondence with the deviation. As a result, since stereoscopic viewing using two images, i.e., the images a3 and a4, can be attained, a stereoscopic viewing state can be maintained. In this manner, when the number n of linear images is increased, the stereoscopic viewing region can be widened, and the stereoscopic feeling of an image can be prevented from being easily impaired by movement of the view points.

However, when the number n of linear images is merely increased, the stereoscopic viewing region widens but the following problem is posed.

In a method of arranging n linear images on a portion immediately below a lenticular lens, when the observer observes an image while setting his or her view point at a position which is located on the central line of a total image width A of linear images formed on the diffusion surface of the lenticular lens sheet, allows the observer to look at all the images, and is separated from the display surface by an optimal distance (to be referred to as a predetermined optimal observation position hereinafter), if the lenticular lens sheet has a large total image width A, he or she cannot observe the central portion and peripheral portion of a photographed image from a single view point since the line of sight has a field angle. When the field angle becomes larger, only a linear image corresponding to a neighboring lens is observed via a peripheral lens. For this reason, on a peripheral portion of an image to be observed, the observed image may flicker since observation of the image is disturbed, or multiple images may be observed due to observation of different images. As a result, satisfactory stereoscopic viewing cannot be attained.

In order to solve the above-mentioned problem, the following method disclosed in Japanese Laid-Open Patent Application No. 5-289208 is known. More specifically, when an image is observed from a predetermined observation position, original images are arranged so that the positions of a j-th original image displayed in correspondence with the respective lenticular lenses are set at the same positions with respect to the predetermined observation position. This method will be described below with reference to FIG. 5.

FIG. 5 is a schematic view for explaining the layout method of linear images disclosed in the above-mentioned reference. In FIG. 5, D0 is the optimal stereoscopic viewing distance (the distance between the center of curvature of the lenticular lens and the view point located at the center of the stereoscopic viewing region), W is the stereoscopic viewing width at the optimal stereoscopic viewing distance D0, f is the focal length of the lenticular lens, r is the radius of curvature of the lenticular lens and t is the thickness of the lenticular lens sheet. The radius of curvature r, the focal length f, and the thickness t nearly satisfy $f=t-r$.

In the above reference, linear images formed on the rear surface portions of the respective lenses of the lenticular lens sheet are arranged so that if, in the case of two images, a point where a line connecting the center of an assumed predetermined region at a prospective observation position and the center of curvature of one of the lenses on the lenticular lens sheet crosses a linear image display surface is represented by C2, the position of an image located at the center of a plurality of linear images arranged on the linear image display surface of the lens of interest comes to the point C2. With this layout, linear images observed via the lenses of the lenticular lens sheet allow satisfactory stereoscopic viewing even at the peripheral portion of an image.

However, the above-mentioned conventional three-dimensional display apparatus suffers the following problem.

When stereoscopic viewing is attained using a lenticular lens sheet, if an image to be observed has a certain large total width, the image is eclipsed by a neighboring lens at the peripheral portion of the lenticular lens sheet. Since none of the conventional three-dimensional display apparatuses consider the problem of an eclipse, an image eclipse occurs at the peripheral portion, and satisfactory stereoscopic viewing cannot be attained. The eclipse disturbs an increase in width of an image to be observed.

Furthermore, the conventional three-dimensional display apparatus, in which linear images are arranged so that a j-th original image is set at the same position with respect to a predetermined observation position, suffers another problem in addition to the problem of an eclipse. That is, in this apparatus, since the total of the widths of n linear images (to be referred to as a pitch Pa of an image hereinafter) is equal to the pitch of the lenticular lens, a non-image region remains between adjacent sets of n linear images. If the interval (base length) between the two eyes is represented by K, since the width W of the stereoscopic viewing region is determined by $W=n \cdot K$, the stereoscopic viewing region can only be widened by increasing n.

SUMMARY OF THE INVENTION

It is an object of the present invention to provide a three-dimensional display apparatus which can solve the above-mentioned problems, is free from generation of an eclipse, and can increase the width of an image to be observed.

It is another object of the present invention to provide a three-dimensional display apparatus which can widen the stereoscopic viewing region independently of the number n of images.

In order to achieve the above objects, according to one aspect of the present invention, there is provided a stereoscopic image display apparatus which allows an observer to recognize a stereoscopic image, comprising:

a lenticular lens sheet constituted by arranging a plurality of lenticular lenses; and display means for sequentially arranging and displaying, on a rear surface portion of the lenticular lens sheet, bundles each including n stripe images which are obtained by dividing n parallax images from different view points into a plurality of stripe images, and bundling corresponding stripe images constituting the respective parallax images, wherein when a deviation amount of a central position of each of the lenticular lenses and a central position of the bundle of stripe images is given by $\gamma(t-r)/(2D0)$ (where K is the assumed interval between two eyes of the observer, D0 is the optimal stereoscopic viewing distance, t is the thickness of the lenticular lens sheet, and r is the radius of curvature of the lenticular lens) at an end portion of an image displayed by the display means, the apparatus satisfies $0<\gamma<1$.

According to a preferred aspect of the present invention, the display means comprises an LCD video projector.

According to a preferred aspect of the present invention, the stereoscopic image display apparatus satisfies:

$$\gamma = n(1-(N-1)\cos\phi)/(n-(N-1)\cos\phi)$$

where $\phi$ is an angle half an angle defined between two ends of an arc defining a lens effect surface of the lenticular lens, and the center of curvature of the lens, and N is the refractive index of the lenticular lens.

According to another aspect of the present invention, there is provided a stereoscopic image display apparatus which allows an observer to recognize a stereoscopic image, comprising:

a lenticular lens sheet constituted by arranging a plurality of lenticular lenses; and display means for sequentially arranging and displaying, on a rear surface portion of the lenticular lens sheet, bundles each including n stripe images which are obtained by dividing n parallax images from different view points into a plurality of stripe images, and bundling corresponding stripe images constituting the respective parallax images, wherein when a deviation amount of a central position of each of the lenticular lenses and a central position of the bundle of stripe images is given by $\gamma(t-r)/(2D0)$ (where K is the assumed interval between two eyes of the observer, D0 is the optimal stereoscopic viewing distance, t is the thickness of the lenticular lens sheet, and r is the radius of curvature of the lenticular lens) at an end portion of an image displayed by the display means, the apparatus satisfies $1<\gamma$.

According to a preferred aspect of the present invention, the display means comprises an LCD video projector.

According to one aspect of the present invention, there is provided a stereoscopic image display method which allows an observer to recognize a stereoscopic image, comprising the steps of:

forming a plurality of stripe images by dividing n parallax images from different view points into stripe images; and sequentially arranging and displaying, on a rear surface portion of a lenticular lens sheet constituted by arranging a plurality of lenticular lenses, bundles each including n stripe images which are obtained by bundling corresponding stripe images constituting the respective parallax images, wherein when a deviation amount of a central position of each of the lenticular lenses and a central position of the bundle of stripe images is given by $\gamma(t-r)/(2D0)$ (where K is the assumed interval between two eyes of the observer, D0 is the optimal stereoscopic viewing distance, t is the thickness of the lenticular lens sheet, and r is the radius of curvature of the lenticular lens) at an end portion of an image displayed in the display step, the method satisfies $0<\gamma<1$.

According to a preferred aspect of the present invention, the stereoscopic image display method satisfies:

$$\gamma = n(1-(N-1)\cos\phi)/(n-(N-1)\cos\phi)$$

where $\phi$ is an angle half an angle defined between two ends of an arc defining a lens effect surface of the lenticular lens, and the center of curvature of the lens, and N is the refractive index of the lenticular lens.

According to a preferred aspect of the present invention, there is provided a stereoscopic image display method which allows an observer to recognize a stereoscopic image, comprising the steps of:

forming a plurality of stripe images by dividing n parallax images from different view points into stripe images; and sequentially arranging and displaying, on a rear surface portion of a lenticular lens sheet constituted by arranging a plurality of lenticular lenses, bundles each including n stripe images which are obtained by bundling corresponding stripe images constituting the respective parallax images, wherein when a deviation amount of a central position of each of the lenticular lenses and a central position of the bundle of stripe images is given by $\gamma(t-r)/(2D0)$ (where K is the assumed interval between two eyes of the observer, D0 is the optimal stereoscopic viewing distance, t is the thickness of the lenticular lens sheet, and r is the radius of curvature of the lenticular lens) at an end portion of an image displayed in the display step, the method satisfies $1<\gamma$.

Some examples of an image display apparatus according to the present invention will be described in the following description of the embodiments.

BRIEF DESCRIPTION OF THE DRAWINGS

FIGS. 2A and 2B are perspective views showing a lenticular lens sheet and a portion constituting linear images formed on the rear surface portion of the lenticular lens sheet in a "real size" image display system, in which FIG. 2A shows a reflection type system, and FIG. 2B shows a transmission type system;

FIGS. 3A, 3B and 3C are perspective views showing a lenticular lens sheet and a portion constituting linear images formed on the rear surface portion of the lenticular lens sheet in a "projection" image display system, in which FIG. 3A shows a reflection type system, and FIG. 3B and 3C show a transmission type system;

FIGS. 11A, 11B and 11C are graphs showing the relationship obtained when the limitation of the condition of an eclipse given by formula (5) is added to the graph shown in FIG. 10.

DETAILED DESCRIPTION OF THE PREFERRED EMBODIMENTS

The preferred embodiments of the present invention will be described hereinafter with reference to the accompanying drawings.

Figure 6:
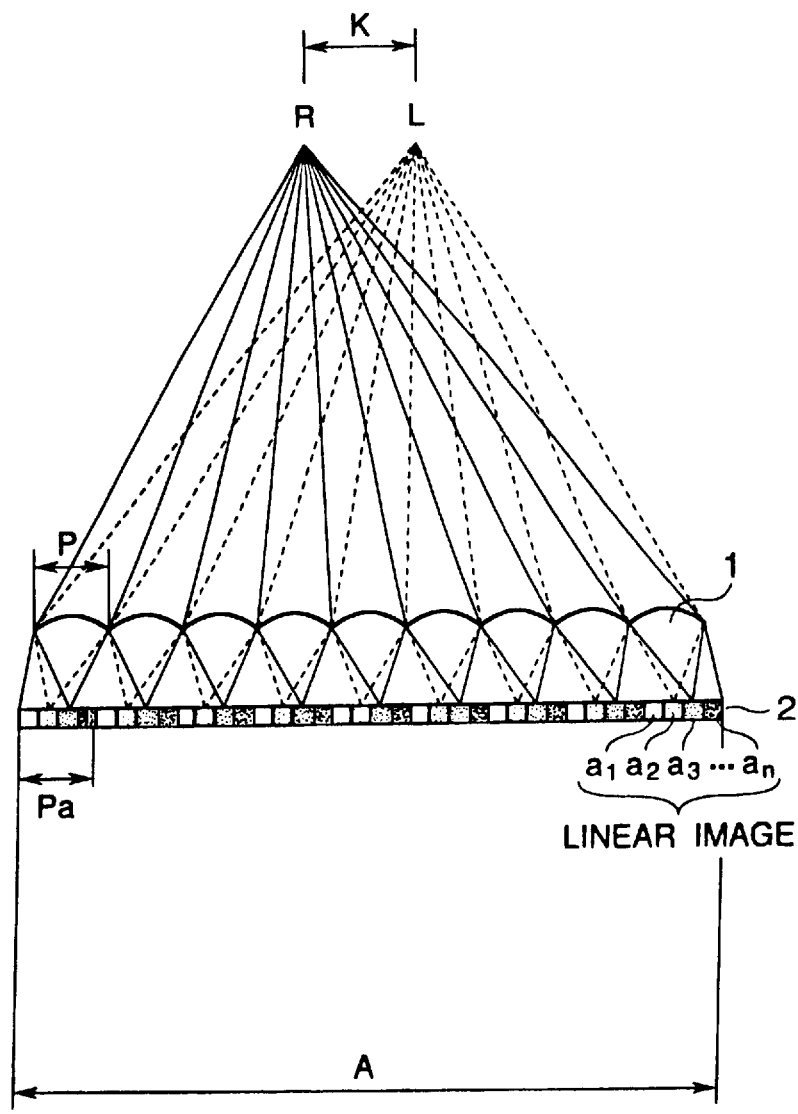
FIG. 6 is a schematic view for explaining the arrangement of a three-dimensional display apparatus according to the first embodiment of the present invention.

FIG. 6 is a schematic view for explaining the arrangement of a three-dimensional display apparatus according to the first embodiment of the present invention.

In FIG. 6, a lenticular lens sheet 1 is constituted by arranging a plurality of surfaces (lenticular lenses) each having the same radius of curvature and a lens effect in one direction. The lenticular lens sheet 1 has a linear image display surface 2 formed on its rear surface portion. An image displayed on the image display surface 2 is observed from view points R and L of the right and left eyes.

In the three-dimensional display apparatus of this embodiment, if the base length between the right and left view points R and L of an observer is represented by K, bundles each including n linear images a1 to an, which are obtained by dividing n parallax images, formed based on n continuous view points having an interval K therebetween, into linear patterns along the longitudinal direction of the lenticular lens, and arranging and displaying a bundle of corresponding linear images, are displayed in correspondence with the number of lenticular lenses. The images a1 to an displayed in units of lenticular lenses give a satisfactory parallax between adjacent images to the right and left view points R and L. As a display method of these linear images, a printed "real size" image may be arranged and displayed, or a "projection" image may be displayed using a projector such as an LCD video projector.

The pitch, P (mm), of the lenticular lenses of the lenticular lens sheet 1 is different from the width, Pa (mm), of each bundle of images a1 to an arranged in units of lenticular lenses. The bundles of images a1 to an are arranged on the linear image display surface of the linear image display surfaces of the lenticular lenses without any gaps. For this reason, in this embodiment, in the layout of the images a1 to an on the linear image display surface of each lenticular lens of the lenticular lens sheet 1, if the central position (the optical axis position of the lenticular lens) of P is matched with the central position of Pa at substantially the central position of the total image width, A, to be displayed, the center of P gradually deviates from the center of Pa due to the difference between P and Pa toward the peripheral portion of the total image width A. The measure of this deviation will be explained below.

Figure 7:
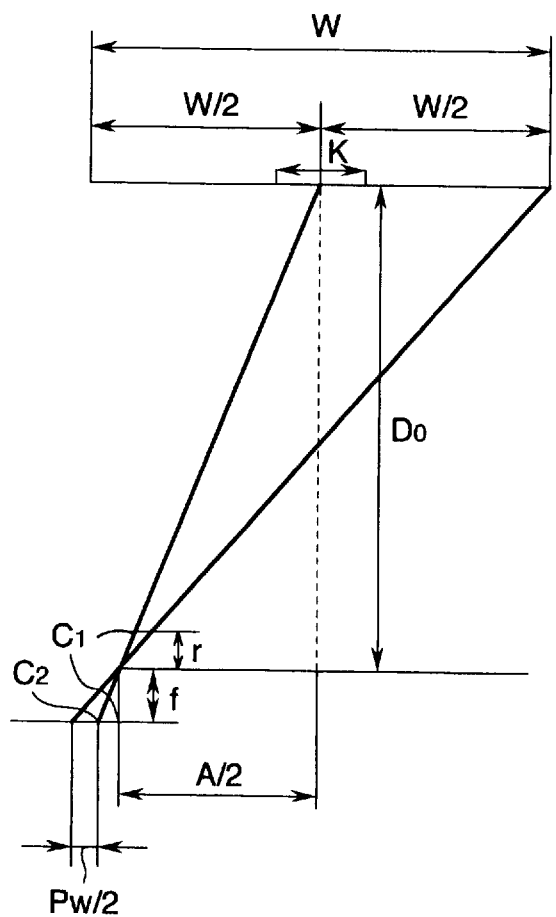
FIG. 7 is a schematic view for explaining the measure indicating a deviation of each linear image in the three-dimensional display apparatus shown in FIG. 6.

FIG. 7 is a view for explaining the measure of the deviation. In FIG. 7, W is the width (mm) of the stereoscopic viewing region, K is the base length (mm), D0 is the optimal stereoscopic viewing distance (mm), and A is the total width (mm) of an image displayed by the lenticular lens sheet 1.

In this embodiment, the central position, C1, of one, at the end portion of the total image width A to be displayed, of the lenticular lenses of the lenticular lens sheet 1 has the following deviation from the position, C2, of a central one of images a1 to an to be displayed by the end lenticular lens.

Figure 1:
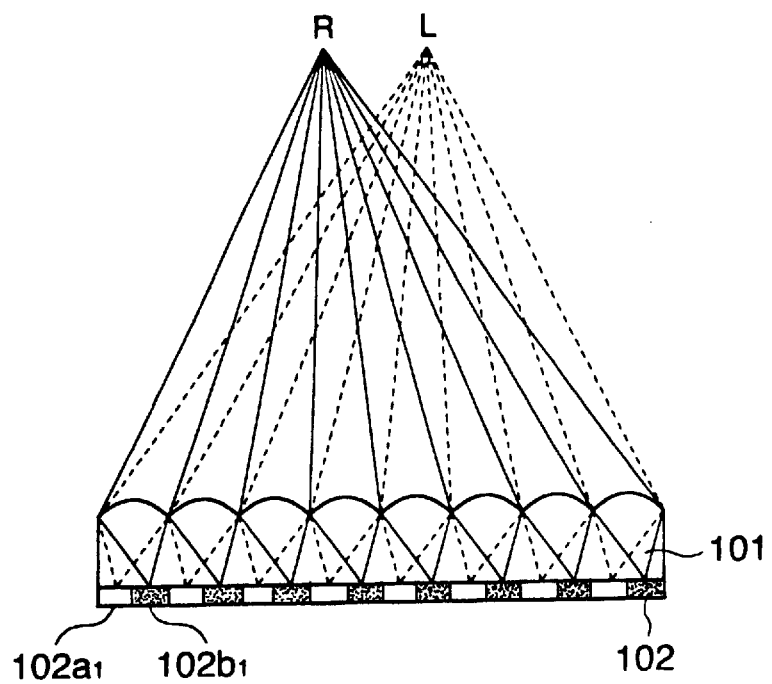
FIG. 1 is a schematic view for explaining stereoscopic viewing in a three-dimensional display apparatus using a lenticular lens sheet.
Figure 2A:
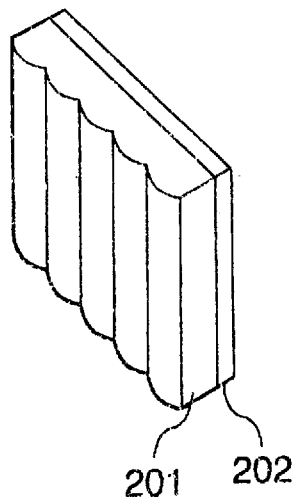
Figure 2B:
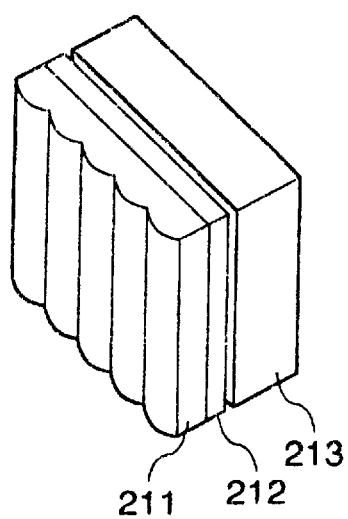
Figure 3A:
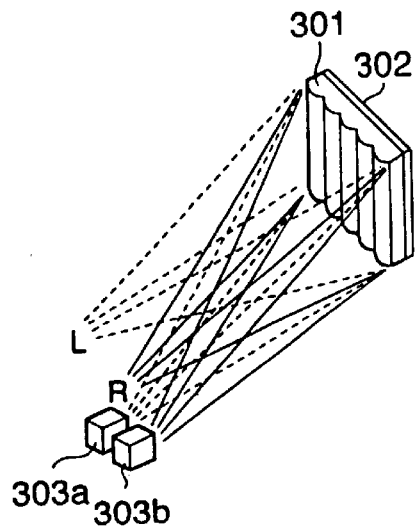
Figure 3B:
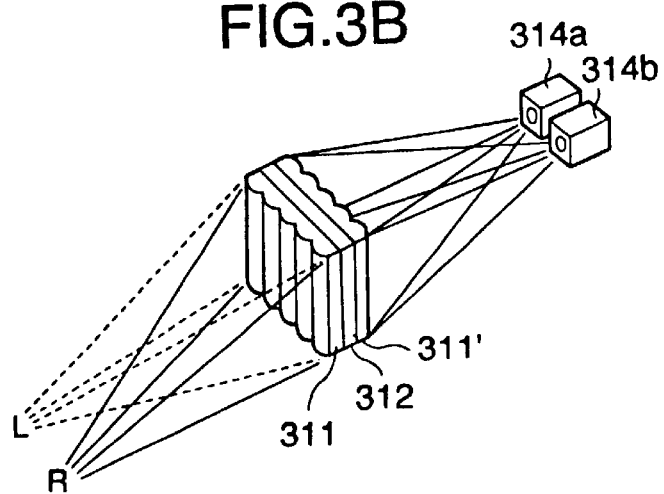
Figure 3C:
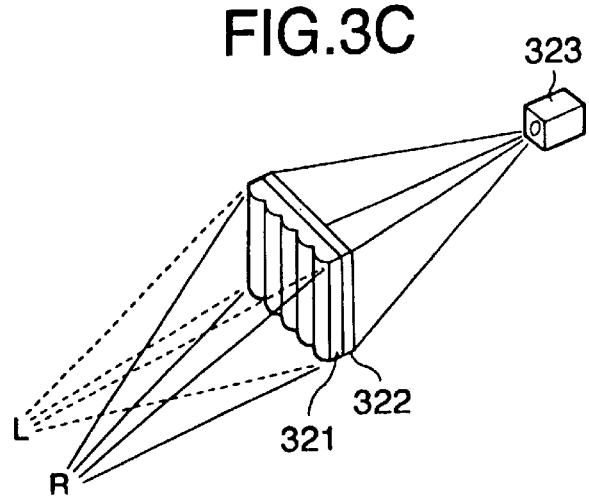
Figure 4:
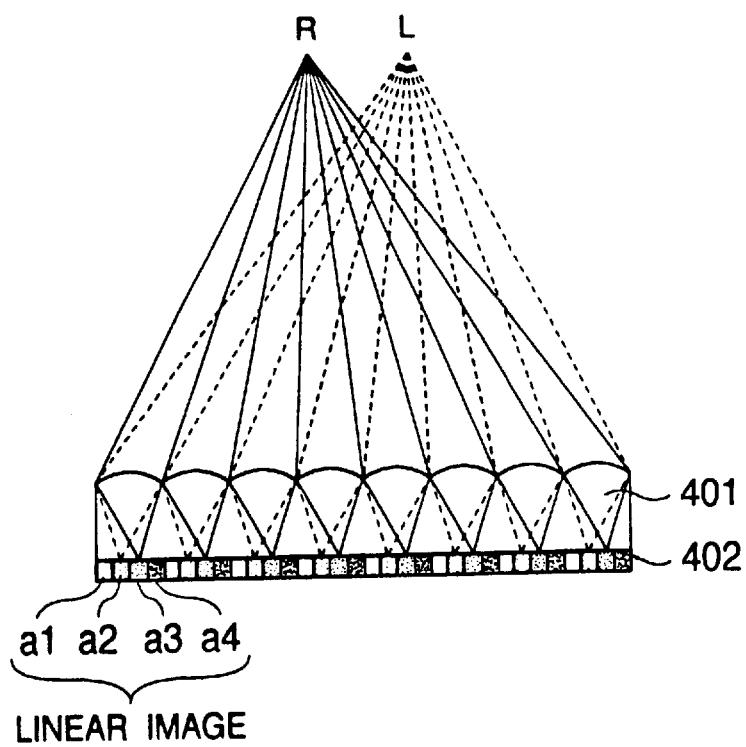
FIG. 4 is a view for explaining the method of shifting a pair of linear images to be observed by the right and left eyes in correspondence with a deviation of view point positions from optimal positions, in which the number of linear images in the three-dimensional display apparatus shown in FIG. 1 is increased from two to four.
Figure 5:
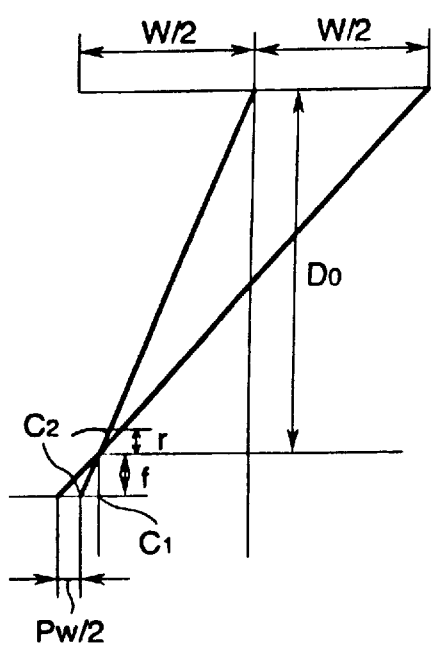
FIG. 5 is a view for explaining the layout method of linear images disclosed in Japanese Laid-Open Patent Application No. 5-289208.

The deviation amount (mm) between the positions C1 and C2 at the end portion of the displayed image is given by (t−r)A/(2D0) (where t is the thickness (mm) of the lenticular lens sheet 1 and r is the radius of curvature (mm) of the lens) by a geometric similar relationship in the conventional method shown in FIG. 5. If the measure, d, of the deviation between P and Pa is given by γ(t−r)A/(2D0) using the above deviation amount as a unit of the measure (note that γ=0 represents a state of C1=C2, i.e., free from any deviation, and γ=1 represents the deviation state by the-method shown in FIG. 5), a general deviation can be defined by γ.

When the newly defined γ is used, in the present invention, P and Pa are determined to satisfy:

$Pa = nKP/(nK - \gamma P)$

Then, Pw shown in FIG. 7 equals Pa, and a layout in which bundles of n linear images a1 to an are arranged without any gaps is obtained. γ satisfies a condition:

$0 < \gamma < 1$

More preferably, γ nearly satisfies:

$\gamma = n(1 - (N-1)\cos\phi)/(n - (N-1)\cos\phi)$ where φ is an angle (φ=arcsin(P/(2r))) half an angle defined between lines connecting the two ends of an arc that defines the lens effect surface of each lenticular lens, and the center of curvature of the lens, and N is the refractive index of the lenticular lens.

As described above, in this embodiment, since bundles of n linear images a1 to an are arranged without any gaps, a non-image region never remains between adjacent bundles of n linear images. In this embodiment, when the above-mentioned conditions are satisfied, problems of stereoscopic viewing being disrupted due to an eclipse, and an image being disturbed by light rays passing a neighboring lens do not easily occur. Furthermore, the total image width A allowing stereoscopic viewing can be set to be larger than that in the conventional apparatus. The reason for this will be explained below.

Figure 8:
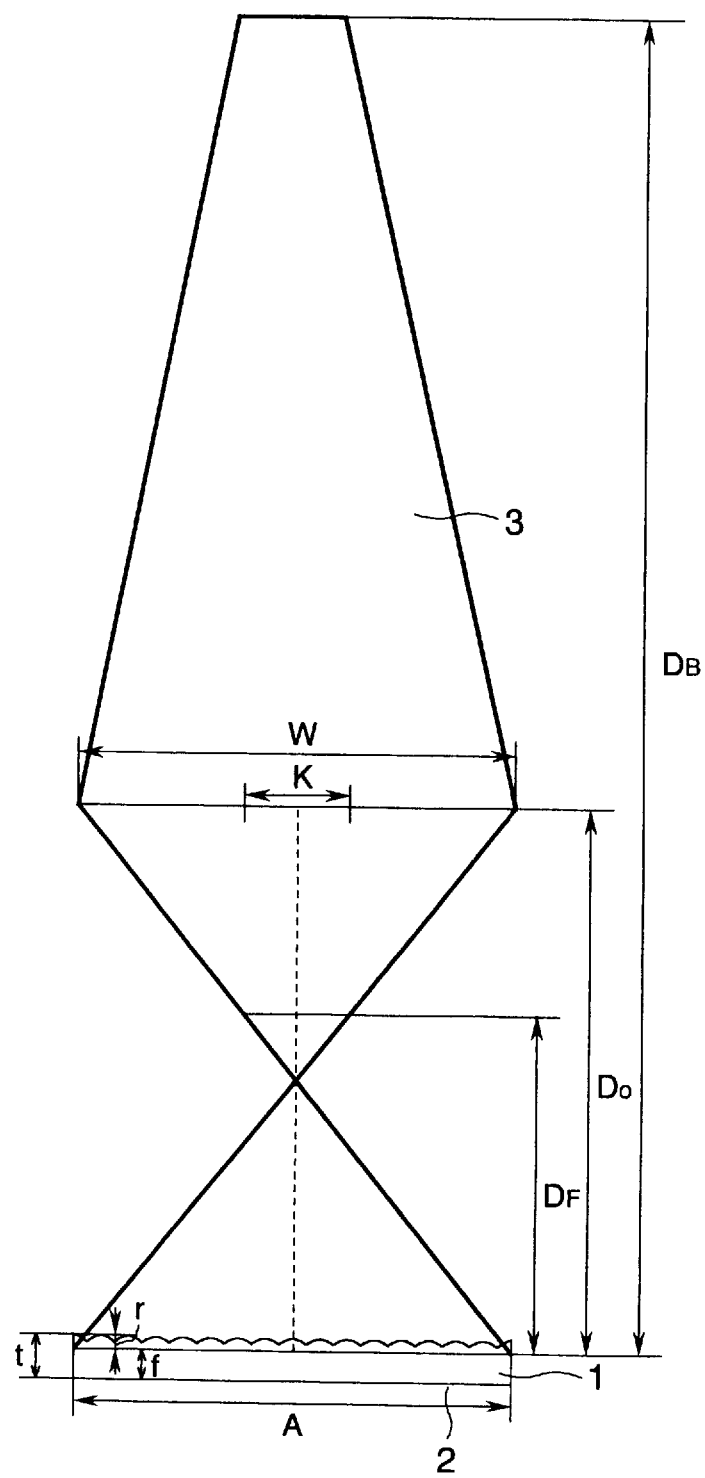
FIG. 8 is a view for explaining the effective stereoscopic viewing region in the three-dimensional display apparatus shown in FIG. 6, i.e., showing the effective stereoscopic viewing region.
Figure 9:
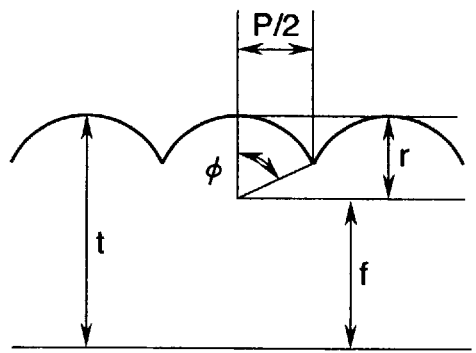
FIG. 9 is an enlarged view of a lenticular lens sheet 1 to explain the effective stereoscopic viewing region in the three-dimensional display apparatus shown in FIG. 6.

FIGS. 8 and 9 are views for explaining the effective stereoscopic viewing region in the three-dimensional display apparatus shown in FIG. 6. FIG. 8 shows the effective stereoscopic viewing region, and FIG. 9 is an enlarged view of the lenticular lens sheet 1. Note that the same reference numerals in FIGS. 8 and 9 denote the same parts as in the three-dimensional display apparatus shown in FIG. 6.

In FIG. 8, bundles each including n linear images, which are obtained by dividing n images formed based on n continuous view points having an interval corresponding to the base length K therebetween, and bundling corresponding images, are sequentially arranged on the linear image display surface 2 of the lenticular lens sheet 1 as in the three-dimensional display apparatus shown in FIG. 6. The thickness of the lenticular lens sheet 1 is t, and the radius of curvature of each lens is r. In FIG. 8, upon observation of the total width A of images arranged on the linear image display surface 2 via the lenticular lens sheet 1, stereoscopic viewing is attained in a stereoscopic viewing region 3. Also, in FIG. 8, W is the width (mm) of the stereoscopic viewing region, D0 is the optimal stereoscopic viewing distance (mm), FD is the closest stereoscopic viewing distance (mm), and DB is the farthest stereoscopic viewing distance (mm). The stereoscopic viewing region 3 normally has a hexagonal prism shape, as shown in FIG. 8. In FIG. 9, P is the pitch of the respective lenticular lenses of the lenticular lens sheet 1, and $\phi$ is an angle half an angle defined between the center of the radius of curvature r and the edge of each lens. P and $\phi$ serve as important parameters upon analysis of an eclipse due to the joint portions of the respective lenticular lenses.

For the sake of simplicity, since, normally, $e=Nr/(N-1)$ and $f=r/(N-1)$ (N is the refractive index of the lenticular lens), the focal length f of the lenticular lens f is defined by $f \equiv t-r$.

It is confirmed from the definition formula and geometric examination of $\gamma$ that the measure $\gamma$, defined using FIG. 7, of the center deviation amount between the central position C1 of the lenticular lens at the end portion of the total image width A and the position C2 of a central one of n linear images, and the respective quantities (the refractive index N and thickness t of the lenticular lens, the width W of the stereoscopic viewing region, the closest stereoscopic viewing distance DF, and the farthest stereoscopic viewing distance DB) defined in FIGS. 8 and 9 hold the following relations:

$$t=Nr/(N-1) \quad (1)$$

$$W=nK-(1-\gamma)A \quad (2)$$

$$DF=(A+K)D0/(\gamma A+nK) \quad (3)$$

$$DB=(A+K)D0/((2-\gamma)A-(n-2)K) \quad (4)$$

In this embodiment, as described above, the pitch P of the lenticular lens and the width Pa of the linear images satisfy a relation $Pa=nKp/(nK-\gamma P)$. A condition for preventing an image to be observed at the joint portions of lenticular lenses of the lenticular lens sheet 1 at the end portions of a displayed image (the image width A) from being influenced by an eclipse can be expressed by:

$$A/K \leq n(1-(N-1)\cos\phi)/(\gamma(N-1)\cos\phi) \quad (5)$$

Figure 10:
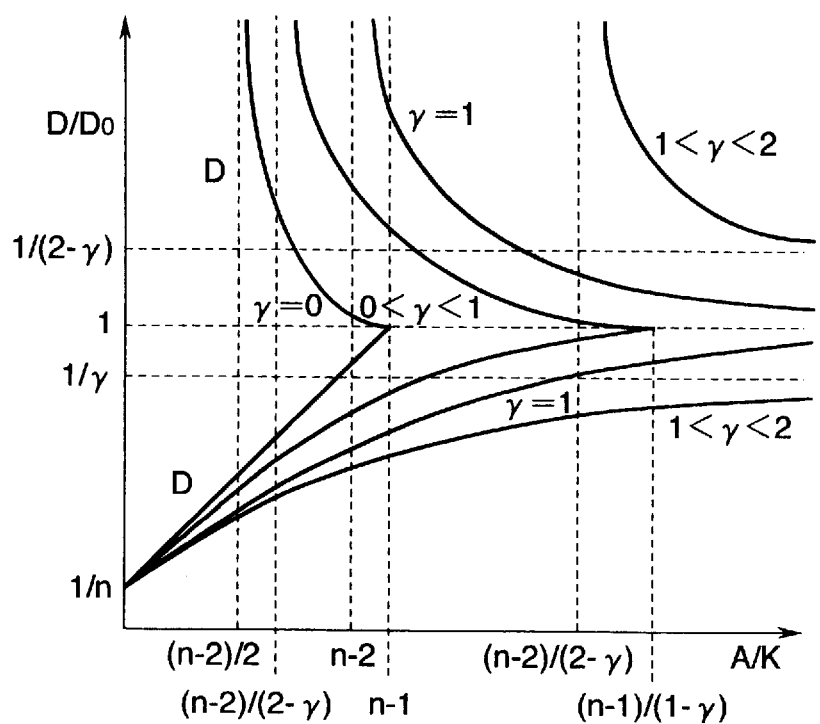
FIG. 10 is a graph showing the relationship between the values A/K and D/D0 when the condition of γ is changed by normalizing formulas (3) and (4)

FIG. 10 is a graph showing the relationship between the values A/K and D/D0 when the condition of $\gamma$ is changed by normalizing formulas (3) and (4). In the graph shown in FIG. 10, D/D0 is plotted along the ordinate, and A/K is plotted along the abscissa. A curve present in the region satisfying D/D0>1 represents the farthest stereoscopic viewing distance DB, and a curve present in the region satisfying D/D0<1 represents the closest stereoscopic viewing distance DF. FIG. 10 reveals the following four findings.

(1) In the region satisfying $A/K<(n-2)/(2-\gamma)$, the farthest stereoscopic viewing distance DB is $\infty$. In the region satisfying $A/K>(n-2)/(2-\gamma)$, $A/K=(n-2)/(2-\gamma)$ is an asymptotic line of the curve representing the farthest stereoscopic viewing distance DB.

(2) Under the condition $0<\gamma<1$, since $A/K=(n-1)/(1-\gamma)$ and $D/D0=1$, an intersection of the curves representing the closest and farthest stereoscopic viewing distances DF and DB, i.e., a cusp point where DB=DF=D0, is present, and stereoscopic viewing is disturbed in the region satisfying $A/K>(n-1)/(1-\gamma)$.

(3) Under the condition $\gamma=1$, $D/D0=1$ becomes an asymptotic line of the curves representing the closest and farthest stereoscopic viewing distances DF and DB, and the cusp point is $\infty$. Therefore, the direction of depth is present in the region of all "A/K" values, i.e., all "A" values.

(4) Under the condition $1<\gamma<2$, although the cusp point is $\infty$ as in the case of $\gamma=1$, $D/D0=1/(2-\gamma)$ is an asymptotic line of the curve representing the farthest stereoscopic viewing distance DB, and $D/D0=1/\gamma$ is an asymptotic line of the curve representing the closest stereoscopic viewing distance DF. Therefore, if the value A/K assumes $\infty$, i.e., the value A assumes $\infty$, a depth range of $2(\gamma-1)D0/((2-\gamma)\gamma)$ is obtained.

However, the above-mentioned four points are limited by the condition of an eclipse given by formula (5) above. More specifically, A free from an eclipse has an upper limit value (as $\gamma$ becomes larger, the value of A that an causes an eclipse becomes smaller). FIGS. 11A, 11B, and 11C are graphs showing the relationship obtained when the limitation of the condition of an eclipse given by formula (5) is added to the graph shown in FIG. 10. FIG. 11A shows the relationship when the following condition is satisfied:

ti $0 \leq \gamma \leq n(1-(N-1)\cos\phi)/(n-(N-1)\cos\phi)$

FIG. 11B shows the relationship when the following condition is satisfied:

$n(1-(N-1)\cos\phi)/(n-(N-1)\cos\phi)<\gamma<2n(1-(N-1)\cos\phi)/(n-2(N-1)\cos\phi)$ FIG. 11C shows the relationship when the following condition is satisfied:

$2n(1-(N-1)\cos\phi)/(n-2(N-1)\cos\phi)<\gamma$

Figure 12:
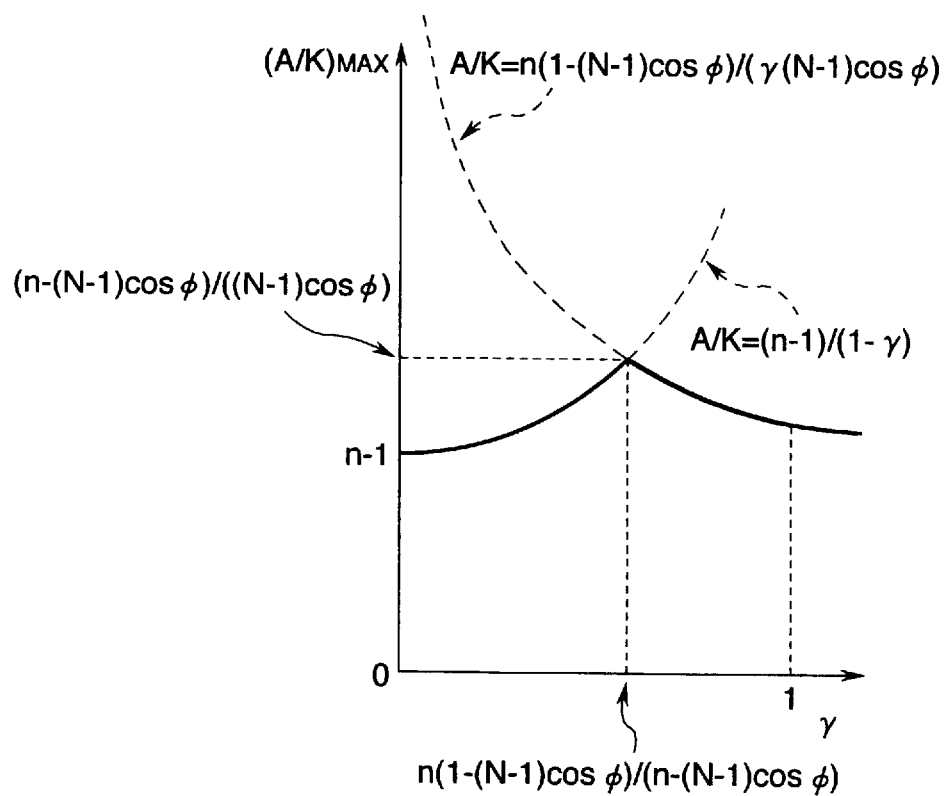
FIG. 12 is a graph which shows the relationship between γ and A on the basis of eclipse conditional formula (5), a conditional formula that yields the optimal stereoscopic viewing distance DB=the closest stereoscopic viewing distance DF, and a conditional formula that yields the width W of the stereoscopic viewing region=the base length K, and plots γ along the abscissa and the normalized image width A along the ordinate, so as to allow easy understanding of the limitation of an eclipse shown in FIGS. 11A, 11B, and 11C.

For the sake of easy understanding of the limitation of an eclipse shown in FIGS. 11A to 11C, FIG. 12 is a graph which shows the relationship between $\gamma$ and A on the basis of eclipse conditional formula (5), a conditional formula that yields the optimal stereoscopic viewing distance DB=the closest stereoscopic viewing distance DF, and a conditional formula that yields the width W of the stereoscopic viewing region=the base length K, and plots $\gamma$ along the abscissa and the normalized image width A along the ordinate. More specifically, FIG. 12 shows a limiting curve free from any eclipse (upward hyperbola to the left):

$$A/K=n(1-(N-1)\cos\phi)/(\gamma(N-1)\cos\phi) \quad (6)$$

and, a limiting curve that yields W=K or DB=DF (downward hyperbola to the left):

$$A/K = (n-1)/(1-\gamma) \qquad (7)$$

As can be seen from FIG. 12, when small γ is set for the conventional deviation method (γ=1) shown in FIG. 5 (0<γ<1), the influence of an eclipse can be eliminated even for a large total image width A. In this case, when γ becomes too small, the depth or width of the stereoscopic viewing region becomes small. Thus, when γ, which is free from any eclipse and can give a maximum image width A that allows stereoscopic viewing is calculated as the value of the intersection between the conditional formula that yields DB=DF and the conditional formula that yields W=K (two conditional formulas agree with each other), i.e., the value of the intersection between formulas (6) and (7) above, we have:

$$\gamma = n(1-(N-1)\cos\phi)/(n-(N-1)\cos\phi) \qquad (8)$$

When γ is set to be the value given by formula (8) above, a maximum total image display width A when the number n of divisions remains the same is obtained.

When the display apparatus is arranged to satisfy the above-mentioned conditions, no non-image regions remain between adjacent sets of n linear images. In addition, a three-dimensional display apparatus free from problems of stereoscopic viewing being disrupted due to an eclipse, and an image being disturbed by light rays passing a neighboring lens can be realized. As compared to a conventional three-dimensional display apparatus which has the same number n of divisions and is disclosed in Japanese Laid-Open Patent Application No. 5-289208, a three-dimensional display apparatus which can assure a larger total image width A that allows stereoscopic viewing can be realized.

A three-dimensional display apparatus according to the second embodiment of the present invention will be described below.

In the three-dimensional display apparatus of the first embodiment described above, a large possible total image width A that is free from any eclipse and allows stereoscopic viewing is assured when the number of divisions of linear images remains the same. Depending on the image to be displayed, a large possible stereoscopic viewing region is required although the total image width A becomes slightly small. In this embodiment, a three-dimensional display apparatus that can assure a large possible stereoscopic viewing region will be described. Note that the apparatus arrangement is the same as that shown in FIG. 6, and a detailed description thereof will be omitted.

The three-dimensional display apparatus of this embodiment is substantially the same as that of the first embodiment, except that the center deviation amount between the central position C1 of the lenticular lens and the position C2 of a central one of n linear images satisfies:

$$1 < \gamma$$

More specifically, in this embodiment, the measure γ has a region satisfying 1<γ shown in FIG. 12, and the total width A of a displayed image is set in a region free from any eclipse in the above-mentioned region. Thus, the stereoscopic viewing region can have a large width W. For example, in formula (2), the apparatus satisfying the condition γ=1 (the conventional deviation method shown in FIG. 5) has W=nK. However, the apparatus satisfying the condition 1<γ has W larger than nK.

As can be seen from FIG. 10 above, the depth of the stereoscopic viewing region can also be set to be larger than that in the conventional apparatus having the deviation amount of γ=1. FIG. 10 illustrates only a curve up to 1<γ<2. When 2<γ, since DB becomes ∞ and has no branches, the depth can be further increased.

As described above, when the total image width A is limited to a small region free from any eclipse, the width W of the stereoscopic viewing region can be set to be W>nK by setting γ to satisfy 1<γ, thus realizing a three-dimensional display apparatus with a large stereoscopic viewing region. In each of the above embodiments, in FIG. 12, the measure γ satisfies the condition given by formula (8) or the condition 1<γ, which is different from the condition of the conventional deviation method shown in FIG. 5. However, when γ is set to be γ=1 in the same manner as in the condition of the conventional deviation method shown in FIG. 5, since the pitch P of the lenticular lenses is different from the width Pa of the bundle of linear images a1 to an in the present invention, no non-image regions remain between adjacent bundles of linear images a1 to an unlike in the conventional deviation method.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A stereoscopic image display apparatus which allows an observer to recognize a stereoscopic image, comprising:

a lenticular lens sheet wherein a plurality of lenticular lenses are arranged in a horizontal direction;

display means for arranging corresponding images from among images obtained by dividing each of a plurality of parallax images whose parallaxes are different in a horizontal direction by a predetermined order to obtain stripe images to arrange and display said stripe images so that each of said stripe images is disposed at the corresponding back surface of said lenticular lens;

wherein when a predetermined distance between both eyes of said observer, an optimum distance for stereoscopic observation, a thickness of said lenticular lens sheet, a radius of curvature of said lenticular lens and a width in a horizontal direction of whole of said arranged stripe images are respectively defined as K, Do, t, r and A, then, a deviation between a position of center of lenticular lens positioned at an end portion in a horizontal direction of said lenticular lens sheet and a position of center of the stripe image corresponding to said lenticular lens satisfies the following condition:

$$d = \gamma(t-r)(A/2)Do(0<\gamma<1).$$

2. An apparatus according to claim 1, wherein said display means comprises an LCD video projector.

3. An apparatus according to claim 1, wherein said apparatus satisfies:

$$\gamma = n(N-1)\cos\phi/(n-(N-1)\cos\phi)$$

where φ is an angle defined between an end of an arc defining a lens effect surface of the lenticular lens and the center of said arc, said angle φ being equal to half an angle defined between two ends of said arc, and N is the refractive index of the lenticular lens.

4. A stereoscopic image display apparatus which allows an observer to recognize a stereoscopic image, comprising:

a lenticular lens sheet wherein a plurality of lenticular lenses are arranged in a horizontal direction;

display means for arranging corresponding images from among images obtained by dividing each of a plurality of parallax images whose parallaxes are different in a horizontal direction by a predetermined order to obtain stripe images to arrange and display said stripe images so that each of said stripe images is disposed at the corresponding back surface of said lenticular lens;

wherein when a predetermined distance between both eyes of said observer, an optimum distance for stereoscopic observation, a thickness of said lenticular lens sheet, a radius of curvature of said lenticular lens and a width in a horizontal direction of whole of said arranged stripe images are respectively defined as K, Do, t, r and A, then, a deviation between a position of center of lenticular lens positioned at an end portion in a horizontal direction of said lenticular lens sheet and a position of center of the stripe image corresponding to said lenticular lens satisfies the following condition:

$$d=\gamma(t-r)(A/2)Do(1<\gamma).$$

5. An apparatus according to claim 4, wherein said display means comprises an LCD video projector.

6. A stereoscopic image display method which allows an observer to recognize a stereoscopic image, comprising the steps of:

forming a plurality of stripe images by dividing each of a plurality of parallax images whose parallaxes are different in a horizontal direction by a predetermined order;

arranging and displaying, on a rear surface portion of a lenticular lens sheet wherein a plurality of lenses are arranged in a horizontal direction, said stripe images so that each of said stripe images is disposed at the corresponding back surface of said lenticular lens, wherein when a predetermined distance between both eyes of said observer an optimum distance for stereoscopic observation, a thickness of said lenticular lens sheet, a radius of curvature of said lenticular lens and a width in a horizontal direction of whole of said arranged stripe images are respectively defined as K, Do, t, r and A, then a deviation between a position of center of lenticular lens positioned at an end portion in a horizontal direction of said lenticular lens sheet and a position of center of the stripe image corresponding to said lenticular lens satisfies the following condition:

$$d=\gamma(t-r)(A/2)Do(0<\gamma<1).$$

7. A method according to claim 6, wherein said method satisfies:

$$\gamma=n(N-1)\cos\phi/(n-(N-1)\cos\phi)$$

where $\phi$ is an angle defined between an end of an arc defining a lens effect surface of the lenticular lens and the center of said arc, said angle $\phi$ being equal to half an angle defined between two ends of said arc, and N is the refractive index of the lenticular lens.

8. A stereoscopic image display method which allows an observer to recognize a stereoscopic image, comprising the steps of:

forming a plurality of stripe images by dividing each of a plurality of parallax images whose parallaxes are different in a horizontal direction by a predetermined order;

arranging and displaying, on a rear surface portion of a lenticular lens sheet wherein a plurality of lenses are arranged in a horizontal direction, said stripe images so that each of said stripe images is disposed at the corresponding back surface of said lenticular lens, wherein when a predetermined distance between both eyes of said observer an optimum distance for stereoscopic observation, a thickness of said lenticular lens sheet, a radius of curvature of said lenticular lens and a width in a horizontal direction of whole of said arranged stripe images are respectively defined as K, Do, t, r and A, then a deviation between a position of center of lenticular lens positioned at an end portion in a horizontal direction of said lenticular lens sheet and a position of center of the stripe image corresponding to said lenticular lens satisfies the following condition:

$$d=\gamma(t-r)(A/2)Do(1<\gamma).$$

* * * * *

UNITED STATES PATENT AND TRADEMARK OFFICE
CERTIFICATE OF CORRECTION

PATENT NO. : 5,838,494

DATED : November 17, 1998

INVENTOR(S) : Keisuke Araki

It is certified that error appears in the above-identified patent and that said Letters Patent is hereby corrected as shown below:

Column 10, line 44, delete "ti".

Signed and Sealed this

Eighth Day of June, 1999

*Attest:*

Q. TODD DICKINSON

*Attesting Officer*  *Acting Commissioner of Patents and Trademarks*

UNITED STATES PATENT AND TRADEMARK OFFICE
CERTIFICATE OF CORRECTION

PATENT NO. : 5,838,494
DATED : November 17, 1998
INVENTOR(S) : Keisuke Araki

It is certified that error appears in the above-identified patent and that said Letters Patent is hereby corrected as shown below:

In the Claims:

Claim 1, column 12, line 48, delete "Do", substitute --D0--.

Claim 1, column 12, after "the following condition:" delete "$d=\gamma(t-r)(A/2)Do$ $(0<\gamma<1)$", insert --$d=\gamma(t-r)A/(2D0)$ $(0<\gamma<1)$--.

Claim 3, column 12, after "wherein said apparatus satisfies:" delete "$\gamma=n(N-1)\cos\phi/(n-(N-1)\cos\phi)$", substitute --$\gamma=n(1-(N-1)\cos\phi)/(n-(N-1)\cos\phi)$--.

Claim 4, column 13, line 16, delete "Do", substitute --D0--.

Claim 4, column 13, after "the following condition:", delete "$d=\gamma(t-r)(A/2)Do$ $(1<\gamma)$" --$d=\gamma(t-r)A/(2D0)$ $(1<\gamma)$--.

Claim 6, column 13, line 44, delete "Do", substitute --D0--.

Claim 6, column 14, line 6, after "the following condition:" delete "$d=\gamma(t-r)(A/2)Do$ $(0<\gamma<1)$", substitute --$d=\gamma(t-r)A/(2D0)$ $(0<\gamma<1)$--.

Claim 7, column 14, line 11, after "said method satisfies:", delete "$\gamma=n(N-1)\cos\phi/(n-(N-1)\cos\phi)$", substitute --$\gamma=n(1-(N-1)\cos\phi)/(n-(N-1)\cos\phi)$--.

Claim 8, column 14, line 37, delete "Do", substitute --D0--.

Claim 8, column 14, after "the following condition:" delete "$d=\gamma(t-r)(A/2)Do$ $(1<\gamma)$", substitute --$d=\gamma(t-r)A/(2D0)$ $(1<\gamma)$--.

UNITED STATES PATENT AND TRADEMARK OFFICE
CERTIFICATE OF CORRECTION

PATENT NO. : 5,838,494
DATED : November 17, 1998
INVENTOR(S) : Keisuke Araki

It is certified that error appears in the above-identified patent and that said Letters Patent is hereby corrected as shown below:

In the Specification:

Column 5, line 23, delete "$\gamma(t-r)/(2D0)$", substitute --$\gamma(t-r)A/(2D0)$--.

Column 5, line 55, delete "$\gamma(t-r)/(2D0)$", substitute --$\gamma(t-r)A/(2D0)$--.

Column 6, line 12, delete "$\gamma(t-r)/(2D0)$", substitute --$\gamma(t-r)A/(2D0)$--.

Column 6, line 43, delete "$\gamma(t-r)/(2D0)$", substitute --$\gamma(t-r)A/(2D0)$--.

Column 10, line 44, delete "ti".

Signed and Sealed this

Twenty-fourth Day of August, 1999

Attest:

Attesting Officer

Q. TODD DICKINSON
Acting Commissioner of Patents and Trademarks